United States Patent
Schmidt

[11] Patent Number: 6,056,661
[45] Date of Patent: May 2, 2000

[54] MULTI-RANGE TRANSMISSION WITH INPUT SPLIT PLANETARY GEAR SET AND CONTINUOUSLY VARIABLE TRANSMISSION UNIT

[75] Inventor: Michael Roland Schmidt, Carmel, Ind.

[73] Assignee: General Motors Corporation, Detroit, Mich.

[21] Appl. No.: 09/332,400

[22] Filed: Jun. 14, 1999

[51] Int. Cl.[7] .............................. F16H 9/26; F16H 37/02
[52] U.S. Cl. ........................................... 475/210; 475/207
[58] Field of Search ................................... 475/210, 211, 475/214, 207, 208

[56] References Cited

U.S. PATENT DOCUMENTS

| | | | |
|---|---|---|---|
| 4,470,326 | 9/1984 | Schmidt | 475/211 |
| 4,599,916 | 7/1986 | Hirosawa | 475/210 |
| 5,201,691 | 4/1993 | Doyle | 475/210 X |
| 5,643,131 | 7/1997 | Kuhn et al. | 475/210 |

FOREIGN PATENT DOCUMENTS

| 65963 | 4/1986 | Japan | 475/210 |
|---|---|---|---|

Primary Examiner—Charles A Marmor
Assistant Examiner—Ankur Parekh
Attorney, Agent, or Firm—Dean L. Ellis

[57] ABSTRACT

A powertrain has an engine, multi-range transmission and a final drive gearing. The transmission includes an input planetary gear set, the carrier of which is driven by the engine, for providing a power split between the sun gear and the ring gear. The sun gear and ring gear both are connected with respective transfer gear members. The gear members are connected to respective members of a continuously variable transmission unit (CVU) and to selectively engageable clutch mechanisms. The clutch mechanisms provide selective drive connections with an output transfer gear mechanism that is drivingly connected with the final drive gearing. The CVU is controlled to establish a variable drive ratio between the transfer gear members connected with the sun gear and the ring gear. Range changes in the powertrain occur at synchronous points of operation in the CVU in a manner to provide three forward ranges and a reverse range.

6 Claims, 3 Drawing Sheets

MULTI-RANGE TRANSMISSION WITH INPUT SPLIT PLANETARY GEAR SET AND CONTINUOUSLY VARIABLE TRANSMISSION UNIT

TECHNICAL FIELD

This invention relates to power transmissions and more particularly to such transmission having a continuously variable unit disposed between an input and an output and cooperating with gear members to provide multiple power ranges.

BACKGROUND OF THE INVENTION

As a general rule, a V-belt transmission will provide a speed range of approximately 5.7 to 1. The maximum speed ratio between the sheaves is approximately 1.0 to 0.42. Under this condition, the output shaft will rotate at 2.39 times faster than the input shaft. This results in the top speed range starting at approximately eighteen percent of the maximum vehicle speed when the maximum engine speed is present. Another problem with most V-belt transmissions is that the belt must transmit full power during maximum vehicle speed. Also many of the systems transmit full engine power through the belt during vehicle launch. In automotive powertrains, the V-belt is the limiting power factor which prevents the V-belt from being used in larger vehicles such as trucks and large sedans. With the current technology in belt structures, the engine displacement is limited to less than three liters.

Split power systems can improve the power capacity of a transmission using a V-belt. U.S. Pat. No. 4,470,326, for example, has a split power geared neutral condition. However the upper ranges do not take advantage of this split power arrangement. The PCT publication WO 94/21941 5,643,131 also appears to disclose a split power V-belt having two speed ranges. This system employs four clutches to accomplish the two speed ranges. Also it would appear that a separate reverse gear arrangement is needed.

SUMMARY OF THE INVENTION

It is an object of the present invention to provide an improved multi-range continuously variable transmission. In one aspect of the present invention, an input split planetary gear arrangement is continuously connected to separate members of a continuously variable unit. In another aspect of the present invention, the members of the continuously variable unit are selectively connectable with a transmission output member. In yet another aspect of the present invention, one of the planetary members is also selectively connectable with the transmission output member.

In still another aspect of the present invention, the input power split is the same in both the low forward range and the reverse range. In a further aspect of the present invention, the transmission has at least two synchronous range interchange points wherein the speeds of the components of the continuously variable unit is the same before and after the interchange.

DESCRIPTION OF AN EXEMPLARY EMBODIMENT

Figure 1:
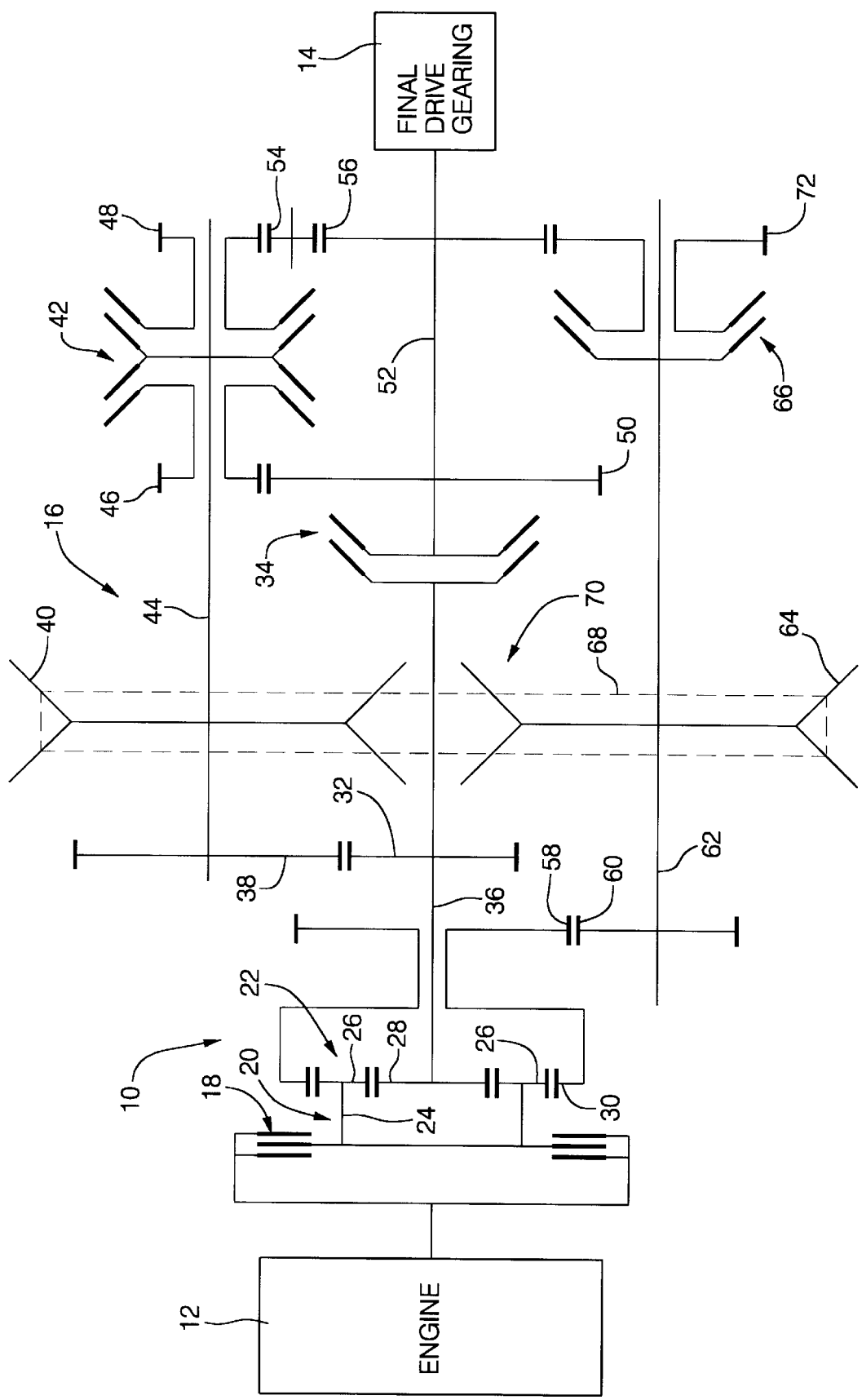
FIG. 1 is a schematic diagram of a powertrain incorporating the resent invention.

A powertrain 10, shown in FIG. 1, includes an engine 12, a final drive gearing 14 and a multi-range continuously variable transmission 16. The engine 12 and final drive gearing 14 are conventional devises which are familiar to those skilled in the art. The transmission 10 has an input clutch 18 which is selectively connectable between the engine 12 and a carrier assembly member 20 of a planetary gear set 22. The clutch 18 is preferably a conventional fluid operated selectively engageable friction device which is controlled during engagement by a conventional control mechanism. The clutch 18 operates as a starting clutch, that is, the clutch is engaged to launch the vehicle and thereafter remains engaged until the vehicle is brought to a stop.

The carrier assembly 20 has a spider or cage 24 on which is rotatably mounted a plurality of pinion gears 26 that are disposed in meshing relation with a sun gear member 28 and a ring gear member 30. The sun gear 28 and the ring gear 30 are also members of the planetary gear set 22. The sun gear 28 is drivingly connected with a transfer gear 32 and a high clutch 34 through a shaft 36. The clutch 34 is a conventional selectively engageable device which may be controlled by many of the well-known clutch control mechanisms. For example, the clutch 34 can be a synchronized type mechanical clutch that can be engaged by an external fluid operated piston, or a fluid operated friction type clutch.

The transfer gear 32 is disposed in meshing relation with a transfer gear 38 which in turn is drivingly connected with a variable diameter sheave or pulley 40 and a selectively engageable clutch 42 through a shaft 44. The clutch 42 may be constructed and operated the same a the clutch 34. However, the clutch 42 is preferably a double acting clutch. When engaged to the left, as seen in FIG. 1, the clutch 42 connects a transfer gear 46 with the shaft 44 and when engaged to the right, the clutch 42 connects a transfer gear 48 with the shaft 44.

The transfer gear 46 meshes with a transfer gear 50 that is drivingly connected with a transmission output shaft 52. The transfer gear 48 meshes with an idler gear 54 that in turn meshes with a transfer gear 56. The transfer gear 56 is drivingly connected with the output shaft 52. The gear train composed of transfer gears 46 and 50 comprise the low forward range gearing and the gear train composed of the transfer gears 48 and 56 and the idler gear 54 comprise the reverse range gearing. The output shaft 52 is also drivingly connected with the clutch 34 and the final drive gearing 14.

The ring gear 30 is drivingly connected with a transfer gear 58 that meshes with a transfer gear 60. The transfer gear 60 is drivingly connected with a shaft 62 that is drivingly connected with a variable diameter sheave or pulley 64 and a selectively engageable clutch 66. The sheave 40 and the sheave 64 are interconnected by a flexible belt 68 which is trained about the sheaves 40 and 64. These members, the sheaves 40 and 64 and the belt 68, cooperate to provide a continuously variable transmission unit (CVU), generally designated 70. The clutch 66 can be constructed and controlled in a manner similar to the clutch 34. The clutch 66 is connected with a transfer gear 72 which is in meshing relation with the gear 56. The transfer gears 46 and 50 and transfer gears 48,56 and 72 and the idler gear 54 comprise an output transfer gear mechanism. The CVU 70 can be controlled by use of many of the well-known electro-hydraulic control mechanisms that are designed to control the effective diameters of variable diameter sheaves.

As previously mentioned, the powertrain 10 will provide three continuously variable forward speed ranges and one reverse speed range. To establish the reverse speed range, the clutch 42 is manipulated to engage the gear 48 with the shaft 44 and to establish the first and lowest forward range, the clutch 42 is manipulated to engage the gear 46 with the shaft 44. The reverse and forward ranges cannot be established simultaneously. The clutch 18 is engaged, as a starting or launching clutch, to connect the engine 12 with the carrier spider 24. The power from the engine 12 is divided by the planetary gear set 22 such that the power is distributed to the sun gear 28 and the ring gear 30.

Figure 2:
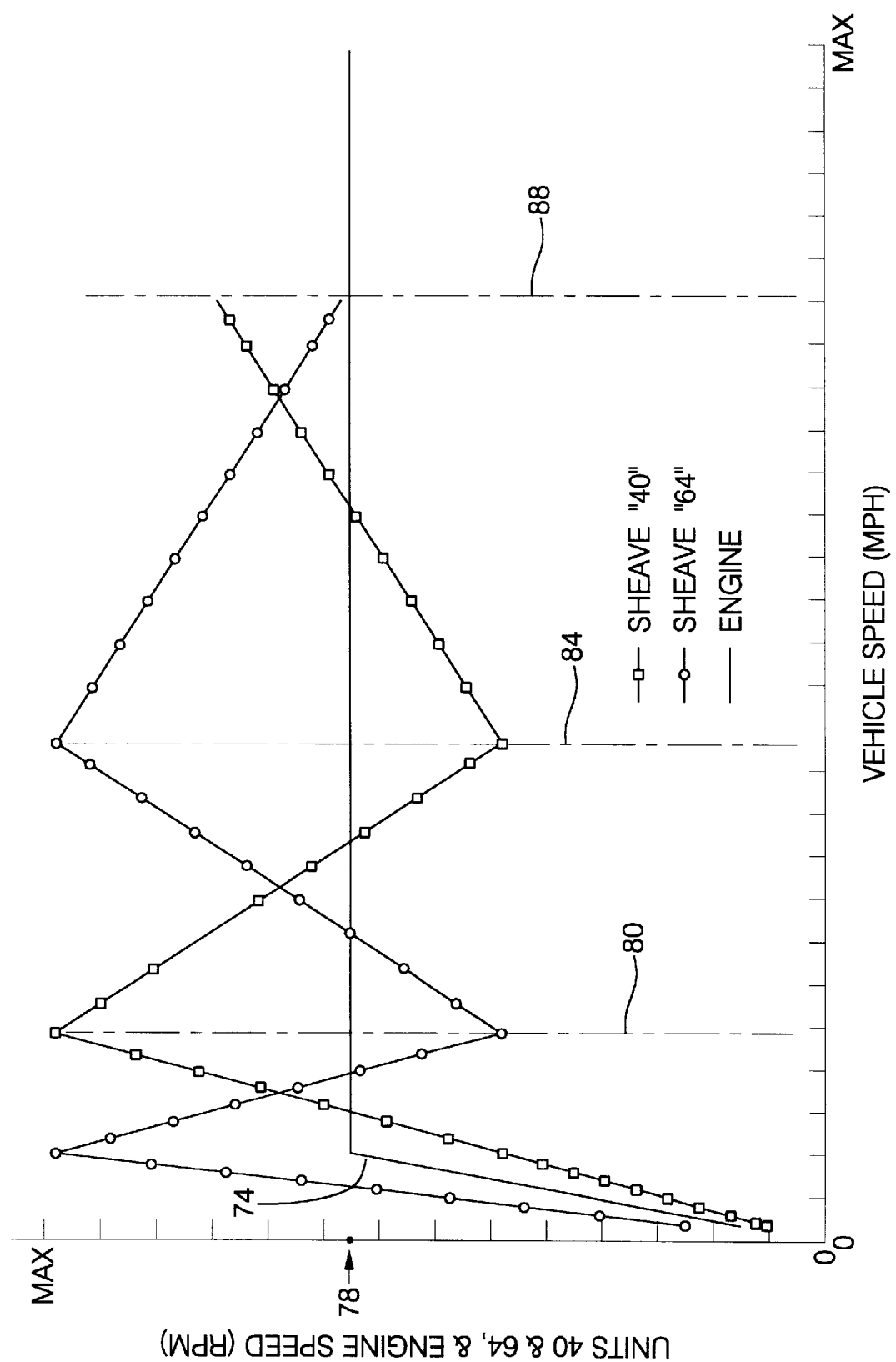
FIG. 2 is a graph depicting the speeds of the units versus vehicle speed.

The power at the sun gear 28 is delivered to the shaft 44 through the transfer gears 32 and 38. The power at the ring gear 30 is delivered to the shaft 62 through the transfer gears 58 and 60. This power splitting arrangement is the same for all forward ranges as well as the reverse range. In the reverse range, the power at the shaft 62 is delivered to the sheave 64. The sheave 64 has the belt trained at a minimum diameter and the sheave 40 has the belt trained at a maximum diameter such that the belt ratio is at a maximum ratio, for example, 2.39 to 1.0. The idler gear 54 reverses the rotational direction of the shaft 44 prior to delivery to the final drive gearing 14. The power and speed distribution depicted in the graphs in FIGS. 2 and 3 are the same for the reverse range and the first forward range.

The initial speed increase of the vehicle is controlled by accelerating the engine from an idle throttle position to an elevated throttle position. The graphs in FIGS. 2 and 3 depict the maximum power settings for the engine, those skilled in the art will recognize that the engine can be operated at other throttle settings. As the speed and power of the engine are increased as represented by the lines 74 and 76, the speed of the sheaves 40 and 64 will also increase and the vehicle speed will increase accordingly.

Figure 3:
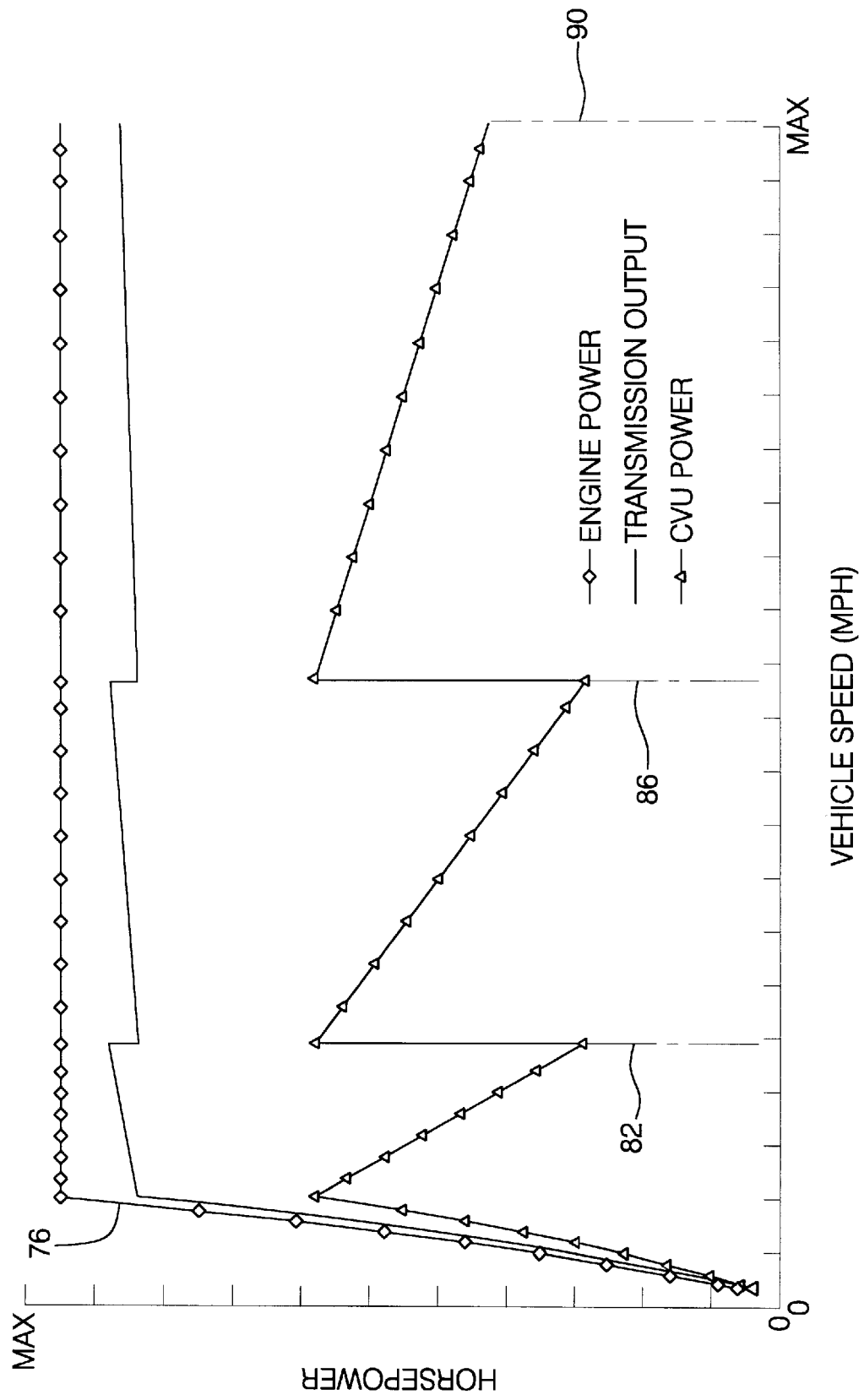
FIG. 3 is a graph depicting the horsepower of the engine, transmission and continuously variable unit versus vehicle speed.

The power distributed to the powertrain through the CVU 70 will increase, but as seen in FIG. 3, the CVU power is always less than the engine power. The difference between the CVU power and the transmission output power is distributed mechanically through the planetary gear set 22. In the reverse range and the first and third forward ranges, the mechanical power is delivered through the sun gear 28 and the CVU power is delivered through the ring gear 30. In the second forward range, the CVU power is delivered through the sun gear 28 and the mechanical power is delivered through the ring gear 30.

When the engine 12 is operating at full speed, for a given throttle condition as represented at point 78, the transmission output speed is further increased by increasing the diameter of the sheave 64 while simultaneously decreasing the diameter of the sheave 40. This will continue until a maximum overdrive ratio of approximately 0.42 to 1.0 is achieved as represented by the line 80 in FIG. 2 and the line 82 in FIG. 3. At this point, the maximum vehicle speed in the reverse range and in the first forward range is achieved. In the first forward range and the reverse range, the power flows through the CVU 70 from the sheave 64 to the sheave 40. It should be noted that the power flow through the CVU 70 decreases while the sheave diameters are being adjusted to increase the vehicle speed.

When the maximum vehicle speed is reached during forward operation, the gear 72 and the shaft 62 will be rotating in unison such that the clutch 66 can be synchronously engaged and the clutch 42 will be simultaneously disengaged from the gear 46. This is achieved at the lines 80 and 82 in FIGS. 2 and 3. During the second forward range, the power flows through the CVU 70 from the sheave 40 to the sheave 64. The CVU 70 is in a maximum underdrive condition after the range interchange from first to second due to the fact that the power flow direction has reversed. To increase the vehicle speed in the second forward range, the diameter of the sheave 40 is increased while the diameter of the sheave 64 simultaneously decreases until a maximum overdrive ratio is reached in the CVU 70 at the lines 84 and 86 in FIGS. 2 and 3. At this point, the powertrain has reached the maximum output speed in the second range.

To establish the third forward range, the clutch 34 is engaged while the clutch 66 is simultaneously disengaged. The shafts 36 and 52 are rotating in unison immediately before and after the range interchange. Therefore the clutch 66 is synchronously engaged. The power flow through the CVU 70 is again reversed such that the power flows from the sheave 64 to the sheave 40. The mechanical power and the CVU 70 power are combined at the shaft 36. The mechanical power flows through the sun gear 58 to the shaft 36; while the CVU 70 power flows through the transfer gears 38 and 32 to the shaft 36. The vehicle speed is increased from the range interchange point at line 84 by increasing the diameter of the sheave 64 while simultaneously decreasing the diameter of the sheave 40. Until the maximum vehicle speed is achieved at the line 88 as seen in FIG. 2. The power flow through the CVU 70 also decreases during the third range from the line 86 to the line 90 as seen in FIG. 3.

The maximum vehicle speed achieved will depend on a number of factors. The rolling resistance and aerodynamic drag force are major components which affect the maximum vehicle speed on a level driving surface. The maximum engine power and engine speed are also important factors. Other factors such as the final drive ratio and the ratio of the transfer gears 38 and 32 as well as the planetary ratio of the planetary gear set 22 will affect the maximum vehicle speed. These factors are within the province of the vehicle and powertrain designers. These factors as well as the driving cycle of the vehicle should be considered during the design phase of the powertrain.

It is considered that the designers will consider the operating points at lines 82, 86 and 90 when establishing the various factors. By establishing the design vehicle speeds at these points to coincide with major operating points during the operating cycle of the vehicle, the power flow through the CVU 70 can be maintained at a minimum which will improve the life and the operating efficiency of the powertrain. For example, the line 82 can be made consistent with urban speed limits, the line 86 can be made consistent with a suburban speed limits and the line 90 can be made consistent with a highway operating speed limits. It will also be appreciated by those skilled in the art that other CVU devices such as topic drives can be used in place of the variable belt mechanism. The control mechanism for establishing the shift schedule and the clutch engagement timing can be established from the currently available electro-hydraulic and electromechanical controls. The controls for starting clutch devices are also currently known to control designers.

What is claimed is:

1. A continuously variable powertrain comprising:

power input means for delivering power to the powertrain;

power output means for delivering power from the powertrain;

a planetary gear set having a first member selectively connectable with said power input means, a second member and a third member;

a continuously variable transmission unit having a first variable member and a second variable member;

a first transfer gear mechanism drivingly connected between said second member and said first variable member;

a second transfer gear mechanism drivingly connected between said third member and said second variable member;

an output transfer gear mechanism drivingly connected with said power output means;

a first clutch mechanism for selectively connecting said first transfer gear mechanism to said output transfer gear mechanism to establish a reverse drive range in said powertrain;

a second clutch mechanism for selectively connecting said first transfer gear mechanism with said output transfer gear mechanism to establish a first forward drive range in said powertrain;

a third clutch mechanism for selectively connecting said second transfer gear mechanism with said output transfer gear mechanism to establish a second forward drive range; and a fourth clutch mechanism for selectively connecting said second member with said power output means for establishing a third forward drive range, said second variable member being operable to transmit power from said second transfer gear mechanism through said first variable member to said first transfer gear mechanism during the third forward drive range.

2. The continuously variable powertrain defined in claim 1 further comprising:

said second variable member being operable to transmit power from said third member through said second transfer gear mechanism to said first variable member during the reverse range and the first forward range.

3. The continuously variable powertrain defined in claim 1 further comprising:

said first variable member being operable to transmit power from said second member through said first transfer gear mechanism to said second variable member during the second forward range.

4. The continuously variable powertrain defined in claim 2 further comprising:

said first variable member being operable to transmit power from said second member through said first transfer gear mechanism to said second variable member during the second forward range.

5. The continuously variable powertrain defined in claim 4 further comprising:

said first variable member comprising a first variable diameter sheave, said second variable unit comprising a second variable diameter sheave and said continuously variable transmission unit including a flexible belt member trained about the first and second variable diameter sheaves.

6. A continuously variable powertrain comprising:

power input means for delivering power to the powertrain;

power output means for delivering power from the powertrain;

a planetary gear set having a planetary carrier assembly selectively connectable with said power input means, a sun gear member and a ring gear member;

a continuously variable transmission unit having a first variable diameter sheave member, a second variable diameter sheave member and a flexible belt member trained about the first and second variable diameter sheaves for transmitting power between the first and second variable diameter sheaves;

a first transfer gear mechanism drivingly connected between said sun gear member and said first variable diameter sheave member;

a second transfer gear mechanism drivingly connected between said ring gear member and said second variable diameter sheave member;

an output transfer gear mechanism drivingly connected with said power output means;

a first selectively engageable clutch mechanism for selectively connecting said first transfer gear mechanism to said output transfer gear mechanism to establish a reverse drive range in said powertrain;

a second selectively engageable clutch mechanism for selectively connecting said first transfer gear mechanism with said output transfer gear mechanism to establish a first forward drive range in said powertrain;

a third selectively engageable clutch mechanism for selectively connecting said second transfer gear mechanism with said output transfer gear mechanism to establish a second forward drive range; and a fourth selectively engageable clutch mechanism for selectively connecting said sun gear member with said power output means for establishing a third forward drive range, said second variable diameter sheave member being operable to transmit power from said second transfer gear mechanism through said first variable diameter sheave member to said first transfer gear mechanism during the third forward drive range.

* * * * *